(12) United States Patent
Akama et al.

(10) Patent No.: US 6,403,744 B1
(45) Date of Patent: Jun. 11, 2002

(54) FLUORINE-CONTAINING COPOLYMER AND COMPOSITION FOR PREPARING LOW REFLECTANCE FILM

(75) Inventors: Shuyo Akama; Hiromi Sugimoto; Kentaro Tsutsumi, all of Saitama (JP)

(73) Assignee: Central Glass Company, Limited, Ube (JP)

( * ) Notice: Subject to any disclaimer, the term of this patent is extended or adjusted under 35 U.S.C. 154(b) by 0 days.

(21) Appl. No.: 09/640,536

(22) Filed: Aug. 17, 2000

(30) Foreign Application Priority Data

Aug. 18, 1999 (JP) ............................................ 11-231687
Mar. 24, 2000 (JP) ........................................ 2000-084628

(51) Int. Cl.[7] ........................ C08F 214/18; C08F 232/02
(52) U.S. Cl. ........................ 526/309; 526/242; 526/247; 526/250; 526/253
(58) Field of Search ................................ 526/250, 253, 526/254, 309, 247, 242

(56) References Cited

U.S. PATENT DOCUMENTS

| | | | |
|---|---|---|---|
| 3,418,302 A | | 12/1968 | Darby |
| 3,449,304 A | | 6/1969 | Harris, Jr. |
| 5,637,663 A | * | 6/1997 | Anolick ........................ 526/254 |
| 5,663,255 A | | 9/1997 | Anolick et al. ............. 526/254 |
| 6,133,389 A | * | 10/2000 | Anolick ........................ 526/206 |
| 6,156,824 A | * | 12/2000 | Yamada ......................... 523/462 |

FOREIGN PATENT DOCUMENTS

JP          1-131215          5/1989

OTHER PUBLICATIONS

Yasuda et al., "Some Aspects of Plasma Polymerization of Fluorine–Containing Organic Compounds", *Journal of Polymer Science,* vol. 15, pp. 2411–2425 (1977).
Briscoe et al., "Electropolymerisation of Perfluorocyclo–Alkenes", Tetrahedron Letters, vol. 29, No. 11, pp. 1295–1298 (1988).

* cited by examiner

*Primary Examiner*—Fred Zitomer
(74) *Attorney, Agent, or Firm*—Crowell & Moring LLP

(57) ABSTRACT

The invention relates to a fluorine-containing copolymer. This copolymer contains 1–99 mol % of a special first repeating unit of a cyclic perfluoro group; and 99–1 mol % of a second repeating unit of a bivalent organic group. The copolymer has a number average molecular weight of from 1,000 to 1,000,000 determined in a gel permeation chromatography using polystyrene as a standard material thereof. The invention further relates to a composition for forming a low reflectance film. This composition contains as a film-forming component a fluorine-containing polymer containing the first repeating unit. This polymer can be the above copolymer. A film formed by applying the composition to a substrate provides low reflectance and is improved in hardness.

19 Claims, 6 Drawing Sheets

FLUORINE-CONTAINING COPOLYMER AND COMPOSITION FOR PREPARING LOW REFLECTANCE FILM

BACKGROUND OF THE INVENTION

The present invention relates to a novel fluorine-containing copolymer, particularly a thermoplastic fluorine-containing copolymer having a fluorine-containing cyclic structure in its main chain. The present invention further relates to a composition for preparing a low reflectance film. The fluorine-containing copolymer can be used as a film-forming component of the composition. A low reflectance film for reducing the light reflectance can be formed on the surface of a glass or transparent substrate by applying the composition thereto.

Japanese Patent Laid-open Publication JP-A-1-131215 discloses a polymer having a fluorine-containing cyclic structure in its main chain. This cyclic structure is a saturated perfluoro ether ring. U.S. Pat. No. 3,418,302 discloses a fluorine-containing polymer obtained by the ring closure polymerization of perfluorodimethylene bis(perfluorovinyl ether). There is known a polymer containing no ether bond, obtained by the cyclization polymerization of a compound represented by the general formula $CF_2=CF(CF_2)_XCF=CF_2$ where X is from 1 to 5, with γ-rays (see JP-A-1-131215, page 2, the right column, lines 8–15). U.S. Pat. No. 3,449,304 discloses a homopolymer of hexafluorocyclopentadiene or perfluorodicyclopentadiene, and copolymers of these compounds with hydrocarbon monomers such as fluoroolefins (e.g., tetrafluoroethylene, hexafluoropropene and vinylidene fluoride), methyl methacrylate and acrylonitrile. Published Japanese Translation of PCT International Publication JP-T-11-501685 discloses a copolymer of 49.0 mol % of hexafluoropropene, 50.4 mol % of tetrafluoroethylene and 0.6 mol % of octafluorocyclopentene. J. Poly. Sci., Polym. Chem. Ed. (1977), 15(10), 2411–2425 discloses a graft polymerization on a polymer substrate by a plasma polymerization method. Tetrahedron Lett. (1988), 29(11) 1295–1298 discloses that a conductive material is obtained by an anode electrolysis polymerization.

In cyclization polymerization, the types of monomers to be copolymerized are limited. Thus, it becomes relatively difficult to control the properties of the resulting copolymers. It is disclosed in JP-A-1-131215 that the types of solvents for dissolving a polymer disclosed in this publication are limited. A homopolymer of hexafluorocyclopentadiene or perfluorodicyclopentadiene, or a copolymer of these compounds has a double bond in the ring structure of its main chain.

There is known a method in which the surface of a substrate is covered with a multilayered film having a $MgF_2$ or $TiO_2$ layer and a $SiO_2$ layer, in order to reduce the light reflectance from the substrate surface. The application of this method to large-size articles is limited. In this method, it is difficult to form a practical film on a plastic article, since it is necessary to conduct a baking step when the multilayer film contains $MgF_2$ layer and the like.

There is known another method in which the surface of a substrate is covered with a film of a fluorine-containing polymer such as polytetrafluoroethylene or a copolymer of tetrafluoroethylene and comonomer, in order to reduce the light reflectance. This type of fluorine-containing polymer is inferior in transparency and dissolution in solvent.

There is known the use of amorphous resins such as TEFLON AF (trade name of Du Pont Co. of the USA) and SAITOP (trade name of Asahi Glass Co., Ltd.) for forming a low reflectance film. These resins are high in transparency, but have a limitation of the solvent types for dissolving the resins. Furthermore, these resins can not be used in some cases in which abrasion resistance is required.

SUMMARY OF THE INVENTION

It is an object of the present invention to provide a fluorine-containing copolymer having a saturated perfluoro group as a ring structure of its main chain, which can be dissolved in various common solvents and can provide a transparent coated film.

It is another object of the present invention to provide a composition for forming a low reflectance film which is improved in hardness.

It is a further object of the present invention to provide an article comprising a substrate and a low reflectance film covering the substrate.

According to the present invention, there is provided a fluorine-containing copolymer comprising 1–99 mol % of a first repeating unit represented by the chemical formula (1) or (2); and 99–1 mol % of a second repeating unit represented by the general formula -Q- where Q is a bivalent organic group,

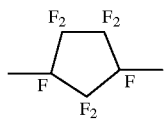

(1)

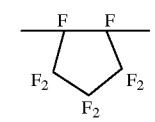

(2)

The fluorine-containing copolymer has a number average molecular weight of from 1,000 to 1,000,000 determined in a gel permeation chromatography using polystyrene as a standard material thereof.

According to the present invention, there is provided a process for producing the fluorine-containing copolymer. This process comprises polymerizing 1–99 mol % of an octafluorocyclopentene with 99–1 mol % of a compound having a polymerizing double bond. The above Q is derived from this compound.

According to the present invention, there is provided a composition for forming a low reflectance film. This composition comprises as a film-forming component a fluorine-containing polymer comprising the above first repeating unit. It is optional to use the above fluorine-containing copolymer as a film-forming component of the composition.

According to the present invention, there is provided an article comprising a substrate and a low reflectance film covering the substrate. This film is prepared by a process comprising applying the above composition to the substrate.

DESCRIPTION OF THE PREFERRED EMBODIMENTS

Figure 1:
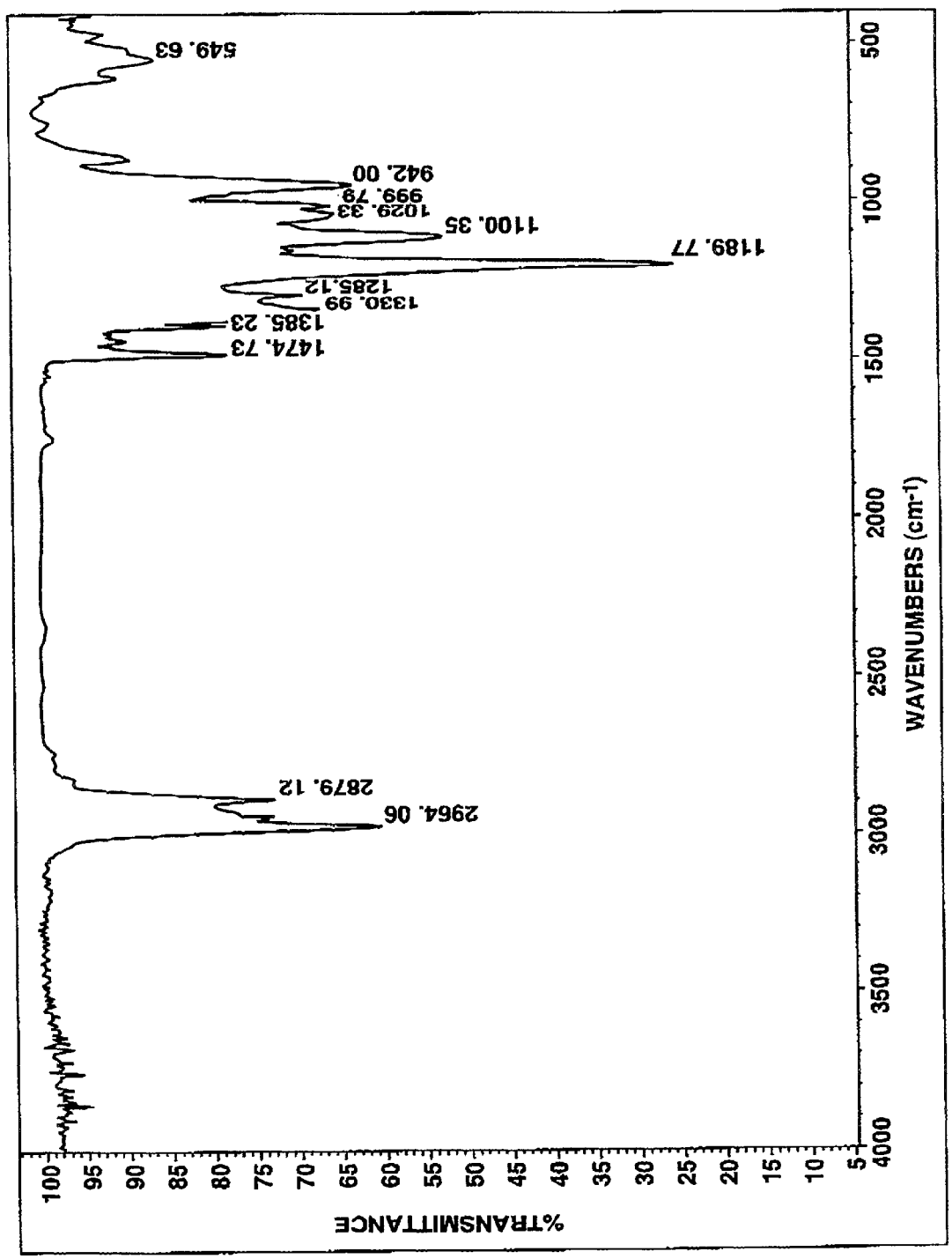
FIGS. 1–6 are graphs respectively showing IR spectra of films of fluorine-containing copolymers in accordance with Examples 1–6.

A fluorine-containing copolymer according to the invention can be dissolved in common solvents (e.g., butyl acetate) and can provide a film that has water repellency, low refractive index and transparency. Thus, this film is useful for protective and functional films of electronic members, optical members, architectural members and the like.

As stated above, a fluorine-containing copolymer according to the invention comprises 1–99 mol % of the first repeating unit and 99–1 mol % of the second repeating unit. The total of these units constitute 100 mol %. The second repeating unit is represented by the general formula -Q- where Q is a bivalent organic group. The second repeating unit may be formed of a single component or different components. In the fluorine-containing copolymer, the first and second repeating units may be bonded with each other alternately or randomly. The components of the first and second repeating units may be bonded with each other regularly or randomly.

The compound having a polymerizable double bond, which is used for introducing the second repeating unit into the fluorine-containing copolymer, is not limited to particular types. Its preferable examples include olefins, vinyl ethers, allyl ethers, vinyl carboxylate and allyl carboxylate. The recitation of the term "vinyl" ($CH_2=CH-$) may include that of the term "allyl" ($CH_2=CHCH_2-$), even if the latter is not explicitly recited in the present specification.

The fluorine-containing copolymer can be used as a film-forming component of the above-mentioned composition for preparing a low reflectance film. Furthermore, the fluorine-containing copolymer by itself can be shaped into a film, since it is usually thermoplastic. Various coating compositions can be prepared by dissolving the fluorine-containing copolymer in solvents. It is also possible to produce a thermosetting resin by combining a suitable cross-linking agent with a fluorine-containing copolymer according to the invention having cross-linking sites introduced by using a polymerizable compound having a functional group in the polymerization. This special fluorine-containing copolymer is useful for preparing a thermosetting paint or film-forming composition. The functional group is not limited to particular types. Its examples include hydroxyl group, carboxyl group, an organic silicon-containing group having a hydrolyzable group, epoxy group and β-ketoester group.

The bivalent organic group (-Q-) may be a group that is derived from an olefin and represented by the general formula $-CX_2-CXR^1-$ where X is hydrogen atom, fluorine atom, chlorine atom or bromine atom, $R^1$ is hydrogen atom, fluorine atom, chlorine atom, bromine atom or a $C_1-C_{30}$ group that is an alkyl group, a cycloalkyl group, a fluoroalkyl group or a cyclofluoroalkyl group. This $C_1-C_{30}$ group optionally has a substituent that is a lower alkyl group, a cycloalkyl group or a lower fluoroalkyl group. The olefin for introducing -Q- into the fluorine-containing copolymer is preferably an olefin that has a double bond at its terminal and is represented by the general formula $CX_2=CXR^1$ where X and $R^1$ are defined as above. The olefin may be a fluoroolefin in which fluorine atom(s) is directly bonded to carbon atom(s) that is in a polymerizing double bond. Examples of fluoroolefin include tetrafluoroethylene, trifluoroethylene, vinylidene fluoride, vinyl fluoride, hexafluoropropene, 1,1,3,3,3-pentafluoropropene, 2,3,3,3-tetrafluoropropene, 1,1,2-trifluoropropene, 3,3,3-trifluoropropene, hexafluoroisobutene, chlorotrifluoroethylene, 1-chloro-1,2-difluoroethylene, 1,1-dichloro-2,2-difluoroethylene. Other olefins for introducing -Q- thereinto are preferably α-olefins such as ethylene, propylene, 1-butene, 1-pentene and 1-hexene. Further preferable olefins include allyl ether, vinyl chloride, vinylidene chloride and vinyl bromide.

The bivalent organic group (-Q-) may be a group derived from a vinyl ether and represented by the general formula $-CH_2-CH(OR^2)-$ where $R^2$ is hydrogen atom or a $C_1-C_{30}$ group that is an alkyl group, a cycloalkyl group, a fluoroalkyl group or a cyclofluoroalkyl group. This $C_1-C_{30}$ group optionally has a substituent that is a lower alkyl group, a cycloalkyl group, a lower fluoroalkyl group, hydroxyl group, an organic silicon-containing group having a hydrolyzable group, epoxy group or β-ketoester group. The vinyl ether for introducing -Q- into the fluorine-containing copolymer is a vinyl ether represented by the general formula $CH_2=CH(OR^2)$ where $R^2$ is defined as above. Exemplary vinyl ethers therefor, having no functional group, are methyl vinyl ether, ethyl vinyl ether, β-chloroethyl vinyl ether, propyl vinyl ether, isopropyl vinyl ether, butyl vinyl ether, isobutyl vinyl ether, sec-butyl vinyl ether, t-butyl vinyl ether, isoamyl vinyl ether, hexyl vinyl ether, heptyl vinyl ether, octyl vinyl ether, 2-ethylhexyl vinyl ether, decyl vinyl ether, cyclohexyl vinyl ether, methylcyclohexyl vinyl ether, benzyl vinyl ether, phenethyl vinyl ether, phenyl vinyl ether, and tolyl vinyl ether. Further exemplary vinyl ethers are fluoroalkyl vinyl ethers such as 2,2,2-trifluoroethyl vinyl ether, 2,2-difluoroethyl vinyl ether, tetrafluoroethyl vinyl ether, 2,2,3,3-tetrafluoropropyl vinyl ether, 2,2,3,3,4,4,5,5-octafluoropentyl vinyl ether, and 2,2,3,3,4,4,5,5,6,6,7,7,8,8,9,9-hexadecafluorononyl vinyl ether.

Similarly, the bivalent organic group (-Q-) may be a group derived from an allyl ether and represented by the general formula $-CH_2-CH(CH_2OR^2)-$ where $R^2$ is defined as above. The allyl ether for introducing -Q- into the fluorine-containing copolymer is an allyl ether represented by the general formula $CH_2=CHCH_2-(OR^2)$ where $R^2$ is defined as above. Exemplary allyl ethers, having no functional group, are methyl allyl ether, ethyl allyl ether, propyl allyl ether, butyl allyl ether, benzyl allyl ether, and cyclohexyl allyl ether.

Similarly, the bivalent organic group (-Q-) may be a group represented by the general formula $-CF_2-CF(OR_f)-$ where $R_f$ is a perfluoroalkyl group. This group is derived from a perfluoroalkyl vinyl ether represented by the general formula $CF_2=CF(OR_f)$ where $R_f$ is defined as above. Exemplary perfluoroalkyl vinyl ethers are perfluoromethyl vinyl ether, perfluoroethyl vinyl ether, perfluoropropyl vinyl ether, perfluorobutyl vinyl ether, perfluoropentyl vinyl ether, perfluorohexyl vinyl ether, perfluorooctyl vinyl ether, and perfluorododecyl vinyl ether.

Exemplary vinyl ethers, having hydroxyl group, for introducing -Q- into the fluorine-containing copolymer are hydroxymethyl vinyl ether, 2-hydroxyethyl vinyl ether, 3-hydroxypropyl vinyl ether, 4-hydroxybutyl vinyl ether, 5-hydroxypentyl vinyl ether, 6-hydroxyhexyl vinyl ether, diethylene glycol monovinyl ether, polyethylene glycol monovinyl ether, and 1,4-cyclohexane dimethanol vinyl ether.

Exemplary allyl ethers, having hydroxyl group, for introducing -Q- into the fluorine-containing copolymer are alkylene glycol monoallyl ethers such as ethylene glycol monoallyl ether, propylene glycol monoallyl ether, diethylene glycol monoallyl ether, polyethylene glycol monoallyl ether and hydroxybutyl allyl ether, and polyhydric alcohols such as allyl alcohol and glycerol monoallyl ether.

Exemplary vinyl ethers, having epoxy group, for introducing -Q- into the fluorine-containing copolymer are represented by the following chemical formulas.

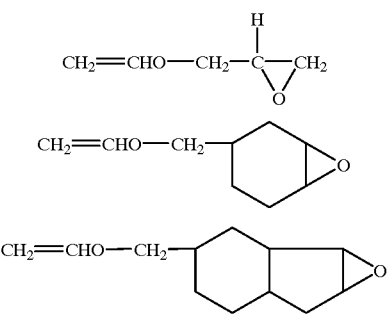

Exemplary allyl ethers, having epoxy group, for introducing -Q- into the fluorine-containing copolymer are represented by the following chemical formulas.

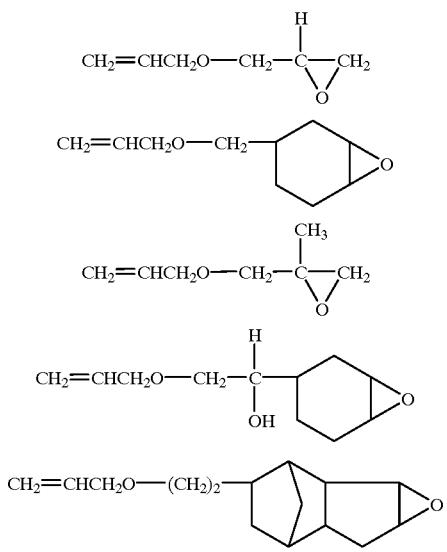

Preferable examples of vinyl ethers or allyl ethers, having β-ketoester group, are allyl acetoacetate and the like. When a monomer containing β-ketoester group is used in the preparation of the fluorine-containing copolymer, this β-ketoester group can serve as a cross-linking site for producing a solvent-thinned paint or water-based emulsion paint. In the preparation of a solvent-thinned paint, it is preferable to use a metal alkoxide or chelate curing agent that can react with β-ketoester group. In the preparation of a water-based emulsion paint, it is preferable to use hydrazine or the like. It is also possible to use a vinyl ether having an organic silicon-containing group having a hydrolyzable group, such as trimethoxysilyl vinyl ether, for introducing -Q- into the fluorine-containing copolymer.

The bivalent organic group (-Q-) may be a group derived from a carboxylic acid vinyl ester and represented by the general formula —$CH_2$—CH(O—$COR^3$)— where $R^3$ is hydrogen atom or a $C_1$–$C_{30}$ group that is an alkyl group, a cycloalkyl group, a fluoroalkyl group or a cyclofluoroalkyl group. This $C_1$–$C_{30}$ group optionally has a substituent that is a lower alkyl group, a cycloalkyl group, a lower fluoroalkyl group, hydroxyl group, an organic silicon-containing group having a hydrolyzable group, epoxy group or β-ketoester group. The carboxylic acid vinyl ester for introducing -Q- into the fluorine-containing copolymer is one represented by the general formula $CH_2$=$CHOCOR^3$ where $R^3$ is defined as above.

Exemplary vinyl esters, having no functional group, for introducing -Q- into the fluorine-containing copolymer are vinyl formate, vinyl acetate, vinyl trifluoroacetate, vinyl chloroacetate, vinyl dichloroacetate, vinyl propionate, vinyl butyrate, vinyl isobutyrate, vinyl crotonate, vinyl trimethylacetate, vinyl caproate, vinyl isocaproate, vinyl pivalate, vinyl caprylate, vinyl pelargonate, vinyl caprylate, vinyl laurate, vinyl myristate, vinyl palmitate, vinyl stearate, vinyl oleate, neononanoic acid ethenyl ester (e.g., VEOVA-9 (trade name) of Showa-Shell Chem. Co.), neodecanoic acid ethenyl ester (e.g., VEOVA-10 (trade name) of Showa-Shell Chem. Co.), vinyl cyclohexanate, vinyl benzoate, vinyl p-toluiate, and vinyl p-tert-butylbenzoate.

Exemplary vinyl esters, having functional group, for introducing -Q- into the fluorine-containing copolymer are carboxylates such as hydroxyethyl crotonate and hydroxybutyl crotonate, and monovinyl dicarboxylates such as monovinyl succinate, monovinyl adipicate, monovinyl sebacate and monovinyl cyclohexanedicarboxylate.

The fluorine-containing copolymer is prepared by copolymerizing a monomer mixture having a suitable chemical composition, in the presence of a polymerization medium, using a polymerization initiator. This copolymerization may be conducted by solution polymerization, suspension polymerization, or emulsion polymerization. A suitable polymerization initiator may be selected depending on the polymerization manner, the polymerization temperature, the type of the polymerization medium, and the like. As the polymerization initiator, there may be used common radical polymerization initiators, for example, dicarbonates such as diisopropyl peroxydicarbonate, di-n-propyl peroxycarbonate, and di-2-ethylhexyl peroxycarbonate; diacyl peroxides such as n-heptafluorobutyric peroxide, lauroyl peroxypivalate, and t-butyl oxyneodecanoate; alkyl peroxides such as di-t-butyl peroxide and t-butylcumyl peroxide; and peroxy esters such as t-butyl peroxypivalate and t-butyl peroxyneodecanoate. Furthermore, water-soluble peroxides, persulfates, water-soluble azo compounds may be used. The polymerization temperature depends on the type of the radical polymerization initiator and may be in a range of from 0 to 130° C.

The polymerization medium is not particularly limited as long as it does not interfere with the polymerization. Non-limitative examples of the polymerization medium are water; alcohols such as t-butanol, isopropanol, ethanol, and methanol; saturated hydrocarbons such as n-hexane and n-heptane; aromatic hydrocarbons such as toluene and xylene; fluorine-containing compounds such as trichlorotrifluoroethane; ketones such as acetone, methyl ethyl ketone, and methyl isobutyl ketone; esters such as ethyl acetate and butyl acetate; and mixtures of at least two of these. It is preferable to use a low-boiling-point alcohol, particularly isopropanol, as the polymerization medium, because it can be easily replaced with another solvent (e.g., xylene, toluene, ethyl acetate, butyl acetate, or propylene glycol methylacetate) after the polymerization.

The fluorine-containing copolymer is not particularly limited in molecular weight. Its number average molecular weight is in a range of from about 1,000 to about 1,000,000 (polystyrene as a standard material in gel permeation chromatography (GPC)). In case that the fluorine-containing copolymer by itself is shaped into an object, it is preferably in a range of from about 10,000 to about 1,000,000 since it becomes possible to improve mechanical strength and heat resistance. If a coating composition containing the copolymer is in the form of liquid, it is preferably in a range of from about 1,000 to about 100,000, more preferably of from 1,000 to 50,000, from viewpoints of the coating composition's conditions such as viscosity and concentration, and the coated film's characteristics such as strength and weather resistance. If it is less than 1,000, the coated film may become inferior in weather resistance and softness. If it is greater than 100,000, the coating composition may become too high in viscosity. Furthermore, the copolymer may not be sufficiently dissolved in the coating composition. If the coating composition is in the form of emulsion, the molecular weight is preferably in a range of from 5,000 to 1,000,000 in order to obtain a coated film that is superior in strength and the like.

The copolymerization may be conducted by radical emulsion polymerization, as stated above, using an emulsifying agent. This emulsifying agent may be an anion or nonion emulsifying agent. Examples of the anion emulsifying agent are alkylbenzenesulfonate, alkylsulfate, polyoxyethylenealkylphenolsulfate, styrenesulfonate, vinylsulfate, and derivatives of these. These salts may be produced by the interaction of the acids (e.g., alkylsulfuric acid) and bases (e.g., alkali metal hydroxides and volatile bases). Examples of the volatile bases are ammonia and triethylamine. Examples of the above-mentioned nonion emulsifying agent are polyoxyethylenealkylphenolethers, polyoxyethylenealkylethers, polyoxyethylene higher fatty acid esters, ethyleneoxide-propyleneoxide block copolymers, fluoroalkylcarboxylates, and fluoroalkylsulfates. The radical polymerization initiator usable in the emulsion polymerization is not limited to a particular type, as long as it is usable in a common emulsion polymerization. A water-soluble initiator is particularly preferably used. Examples of the water-soluble initiator are inorganic peroxides such as hydrogen peroxide; organic peroxides such as cumene hydroperoxide, benzoyl peroxide, t-butyl hydroperoxide, disuccinic acid peroxide, and diglutaric acid peroxide; persulfates such as ammonium persulfate, potassium persulfate, and sodium persulfate; and azo-initiators such as hydrochloride of azobisisobutylamidine, azobisisobutyronitrile, and azobiscyanovaleric acid. Further examples of the water-soluble initiator are redox initiators which are combinations of the above-exemplified initiators and reducing agents such as sodium sulfite, sodium thiosulfate, sodium bisulfite, sodium metabisulfite, sodium bithiosulfate, formaldehyde sodium sulfoxylate, and reducing sugar. To the redox initiator, it is optional to add a small amount of iron, ferrous salt, silver sulfate, copper sulfate, and the like. The radical polymerization initiator may be added at one time or several times.

In the preparation of the coating composition, it is optional to add other additives such as pigment, dye, ultraviolet absorbing agent, light stabilizer, rust preventive agent, dispersant, antisagging agent, coalescing agent, antifungus agent, and antifreezing agent.

The form of the coating composition is not particularly limited. For example, the coating composition may be in the form of a solvent-thinned paint that cross-links at ambient temperature or by baking, a water-based emulsion paint that cross-links at ambient temperature or by baking, a solvent-free paint that cross-links at ambient temperature or by baking, or a non-crosslinking type paint. The coating composition may be in the form of enamel or clear paint.

The coating composition is not particularly limited in cross-linking structure. For example, when the fluorine-containing copolymer contains hydroxyl group, carboxyl group or epoxy group, the cross-linking agent (hardener) can be selected from melamine resin hardeners, urea resin hardeners, polybasic acid hardeners, isocyanate hardeners, and epoxy hardeners. The amount of the cross-linking agent can be decided depending on the amount of the functional group contained in the fluorine-containing copolymer. Nonlimitative examples of the cross-linking agent (hardener) are isocyanates such as isophorone diisocyanate, hexamethylene diisocyanate, tolylene diisocyanate and diphenylmethane diisocyanate, isocyanurates, blocked isocyanates, biuret-containing polyisocyanates, epoxy hardeners each having at least two epoxy groups and being prepared by a reaction of a polyhydric phenol (e.g., bisphenol A) with epichlorohydrine, and amino resins such as urea resins and melamine resins (e.g., alkylated melamine, methylol melamine and imino melamine).

When the fluorine-containing copolymer contains hydroxyl group or carboxyl group, it is preferable to use a polyisocyanate hardener, particularly a hardener selected from polyisocyanate, blocked isocyanate and isocyanurate, which is derived from isophorone diisocyanate. The fluorine-containing copolymer of the invention is well compatible with this harder, and thus there can be obtained a cross-linked or cured film which is transparent and strong. Nonlimitative examples of commercial products of this hardener are DESMODUR Z4370, DESMODUR BL4165 and TPLS2094 of Sumitomo Bayer Urethane Co. and VESTANAT V1890E and B1358 of Hüls Co.

When octafluorocyclopentene is polymerized with a compound having a polymerizing double bond for producing the fluorine-containing copolymer, the amount of this octafluorocyclopentene is at least 1 mol %, preferably at least 10 mol %, based on the total moles of these compounds, from the viewpoint of the obtainment of a desired characteristic due to the introduction of a ring structure in the main chain.

a fluorine-containing copolymer according to the invention has a ring structure in its main chain. Thus, it is a fluorine-containing resin that is amorphous and transparent and can be dissolved in various solvents. Furthermore, it is superior in heat resistance, mechanical strength, chemical stability and water repellency and is low in refractive index. It can be applied to various uses such as transparent coating materials, paint materials, insulating film materials, weather resistant film materials and optical materials.

A composition according to the invention for forming a low reflectance film will be described in detail in the following. This composition contains as a film-forming component a fluorine-containing polymer having the above-mentioned first repeating unit. It may further contain a solvent that is capable of forming a homogeneous solution and a hardener that is in an amount sufficient for hardening the fluorine-containing polymer. This polymer can be the above-mentioned fluorine-containing copolymer. Thus, it is needless to say that all the above descriptions of the fluorine-containing copolymer and the process for preparing the same are applicable to a case in which the fluorine-containing copolymer is used as a film-forming component of the composition, and those descriptions will not be repeated hereinafter.

The first repeating unit can be introduced into the fluorine-containing polymer by polymerizing only octafluorocyclopentene or by copolymerizing octafluorocyclopentene with a compound having a polymerizing double bond. The fluorine-containing polymer contains the first repeating unit in an amount of preferably 1–100 mol %, more preferably 5–100 mol %, still more preferably 10–100 mol %. The fluorine content of the fluorine-containing polymer is preferably of 5–76.1 wt %, more preferably of 10–76.1 wt %, still more preferably of 15–76.1 wt %. If it is less than 5 wt %, the refractive index may become too high. With this, it may not be possible to form a low reflectance film. In the polymerization for preparing the fluorine-containing polymer, the ratio of octafluorocyclopentene to the compound (comonomer) is not particularly limited. In fact, the amount of this octafluorocyclopentene is preferably of 1–100 mol %, more preferably of 5–100 mol %, still more preferably of 10–100 mol %, based on the total moles of all the monomers used in the polymerization. The molecular weight of the fluorine-containing polymer is not particularly limited. In fact, it may have a number average molecular weight of 1,000–1,000,000 determined in gel permeation chromatography using polystyrene as a standard thereof.

Solvent for preparing a composition of the invention is not limited to particular types, so long as it dissolves the fluorine-containing polymer. Preferably exemplary organic solvents include hydrocarbons such as hexane, heptane and octane; esters such as methyl formate, ethyl formate, butyl formate, amyl formate, methyl acetate, ethyl acetate, isopropyl acetate, butyl acetate, sec-butyl acetate, amyl acetate, isoamyl acetate, 2-ethylhexyl acetate, cyclohexyl acetate, ethyl propionate, butyl propionate, amyl propionate, butyl butyrate, diethyl carbonate, diethyl oxalate, methyl lactate, ethyl lactate, ethylene glycol diacetate, and γ-butyrolactone; ketones such as methyl ethyl ketone, methyl isobutyl ketone, diisobutyl ketone, dimethyl oxide, acetyl acetone, cyclohexanone, methylcyclohexanone, and isophorone; ethers such as dimethyl ether, diethyl ether, isopropyl ether, n-butyl ether, and anisole; ether compounds such as ethylene glycol dimethyl ether, propylene glycol monomethyl ether acetate, and diethylene glycol dimethyl ether; and aromatic compounds such as benzene, toluene and xylene. Further exemplary fluorine-containing organic solvents include fluorine-containing aromatic compounds such as perfluorobenzene, pentafluorobenzene, 1,3-bis (trifluoromethyl)benzene, and 1,4-bis(trifluoromethyl) benzene; fluorine-containing cycloalkanes such as perfluorocyclohexane and perfluorocyclopentane; fluorine-containing cycloalkenes such as perfluorocyclohexene and perfluorocyclopentene; and fluorine-containing alkanes such as perfluorohexane and perfluorooctane. Of the above-mentioned solvents, it is preferable to choose halogen-free solvents, particularly the above ketones.

When the composition is used as a hardenable composition, its cross-linking structure is not particularly limited. For example, when the fluorine-containing copolymer contains hydroxyl group, carboxyl group or epoxy group, the cross-linking agent (hardener) can be selected from the above-exemplified hardeners. The amount of the cross-linking agent can be decided depending on the amount of the functional group contained in the fluorine-containing copolymer. The above-mentioned nonlimitative examples of the cross-linking agent (hardener) can be cited here, too. When the fluorine-containing copolymer contains hydroxyl group or carboxyl group, it is preferable to use a polyisocyanate hardener, particularly a hardener selected from polyisocyanate, blocked isocyanate and isocyanurate, which is derived from isophorone diisocyanate. The fluorine-containing copolymer of the invention is well compatible with this harder, and thus there can be obtained a cross-linked or cured film which is transparent and strong. The above-mentioned nonlimitative examples of commercial products of this hardener can be cited here, too.

A composition according to the invention can be applied to transparent substrates such as glass plate, optical lens and other glass articles having various shapes. An article can be prepared by applying the composition to a substrate by spin coating, dip coating, spraying or the like, followed by drying or baking. The drying or baking can be conducted at a temperature of about 20 to about 200° C., although the temperature may vary depending on the solvent type or hardener type.

The following nonlimitative examples are illustrative of the present invention. In fact, Examples 1–6 are illustrative of a fluorine-containing copolymer according to the invention. Examples 7–12 are illustrative of a composition according to the invention for forming a low reflectance film.

EXAMPLE 1

A 0.5-liter stainless steel autoclave provided with an electromagnetic stirrer was charged with 25.1 g of isobutyl vinyl ether, 0.5 g of t-butyl peroxypivalate, 78.1 g of n-butyl acetate and 0.2 g of sodium carbonate decahydrate. The gas atmosphere in the autoclave was replaced by nitrogen gas. Then, 53.6 g of octafluorocyclopentene were introduced into the autoclave. After that, the temperature in the autoclave was raised gradually. Then, the polymerization was conducted for 13 hr at 55° C. Then, the temperature was raised to 73° C., and this condition was maintained for 4 hr, followed by cooling to room temperature. After that, the polymerization liquid was taken out of the autoclave, followed by introduction into a large amount of methanol, thereby precipitating a resin. This resin was separated from methanol and then subjected to a vacuum drying at 60° C., thereby obtaining 49.8 g of a polymer in the form of a white solid. This polymer was found to contain 43.0 wt % of fluorine and to have a number average molecular weight of 14,000 by a gel permeation chromatography (GPC) using polystyrene as a standard material thereof. The polymer was found to have a glass transition temperature of 70° C. by the determination with a differential scanning calorimeter (DSC) (temperature raising rate: 10° C./minute). A solution was prepared by dissolving the polymer in n-butyl acetate. This solution was applied to a glass plate, followed by drying at 140° C. With this, a colorless, transparent film having a thickness of about 10 μm was obtained, followed by removal from the glass plate. This film was found to have a refractive index of 1.42 and a contact angle of water drop thereon of 103 degrees. IR spectrum of this film is shown in FIG. 1.

Separately, a dissolution test was conducted by trying to dissolve 0.1 g of the obtained polymer in several solvents each being in 0.5 g, at room temperature. In this test, the polymer dissolved in each of methyl isobutyl ketone, butyl acetate, n-hexane, trichlorotrifluoroethane, and octafluorocyclopentene, thereby forming a transparent solution. An opaque solution was formed by trying to dissolve the polymer in each of acetone and xylene. The polymer did not dissolve in each of n-butanol, isopropanol and methanol.

EXAMPLE 2

Figure 2:
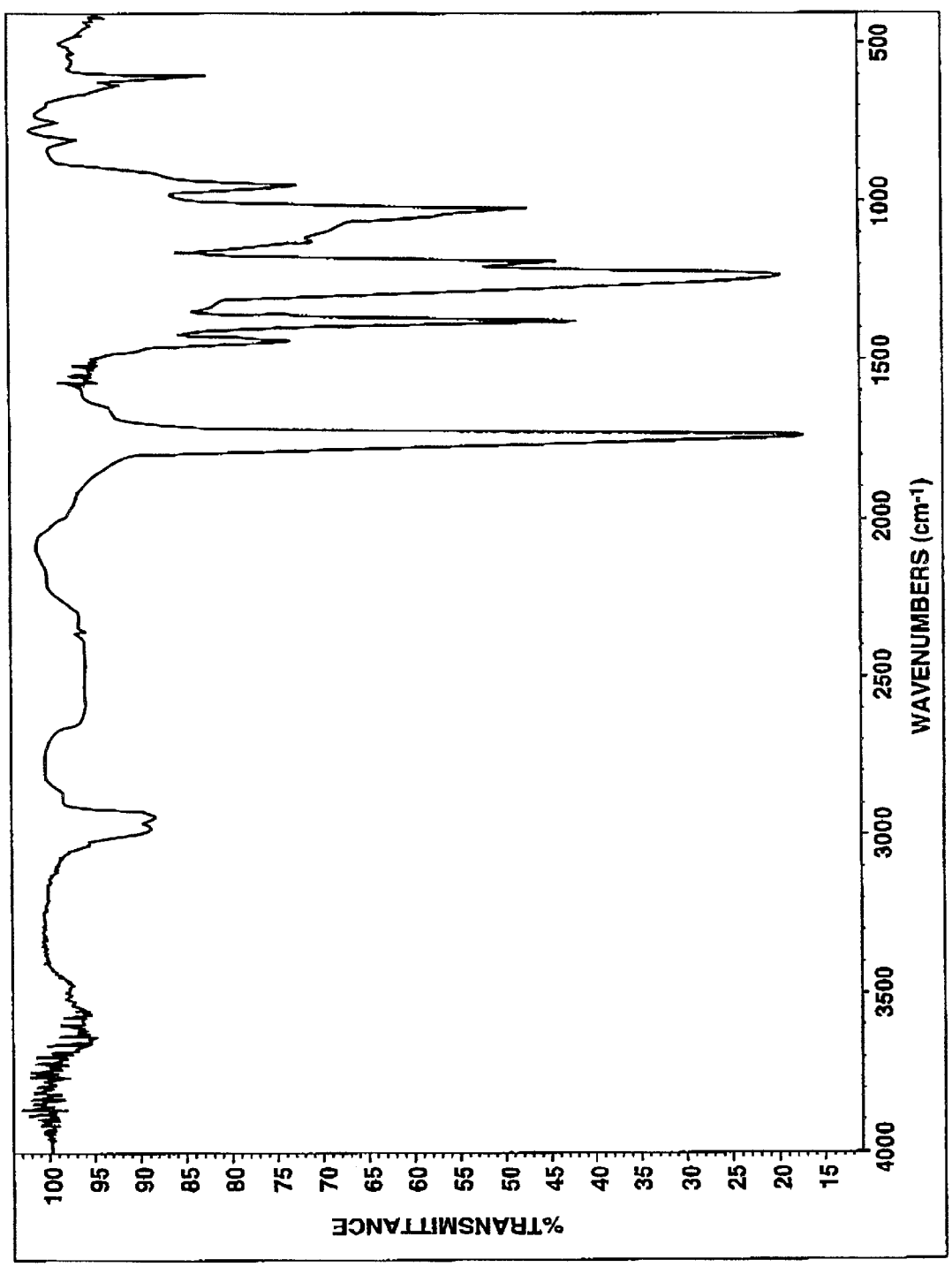

A 0.15-liter stainless steel reaction tube provided with an electromagnetic stirrer was charged with 13.0 g of vinyl acetate, 0.3 g of t-butyl peroxypivalate, 44.7 g of n-butyl acetate and 0.2 g of sodium carbonate decahydrate. The gas atmosphere in the reaction tube was replaced by nitrogen gas. Then, 32.0 g of octafluorocyclopentene were introduced into the reaction tube. After that, the temperature in the reaction tube was raised gradually. Then, the polymerization was conducted for 13 hr at 55° C. Then, the temperature was raised to 73° C., and this condition was maintained for 4 hr, followed by cooling to room temperature. After that, the polymerization liquid was taken out of the reaction tube, followed by introduction into a large amount of n-hexane, thereby precipitating a resin. This resin was separated from n-hexane and then subjected to a vacuum drying at 60° C., thereby obtaining 16.6 g of a polymer in the form of a white solid. This polymer was found to have a number average molecular weight of 18,000 by the GPC. A solution was prepared by dissolving the polymer in acetone. This solution was applied to a glass plate, followed by drying at 140° C. With this, a colorless, transparent film having a thickness of about 10 μm was obtained, followed by removal from the glass plate. IR spectrum of this film is shown in FIG. 2.

EXAMPLE 3

Figure 3:
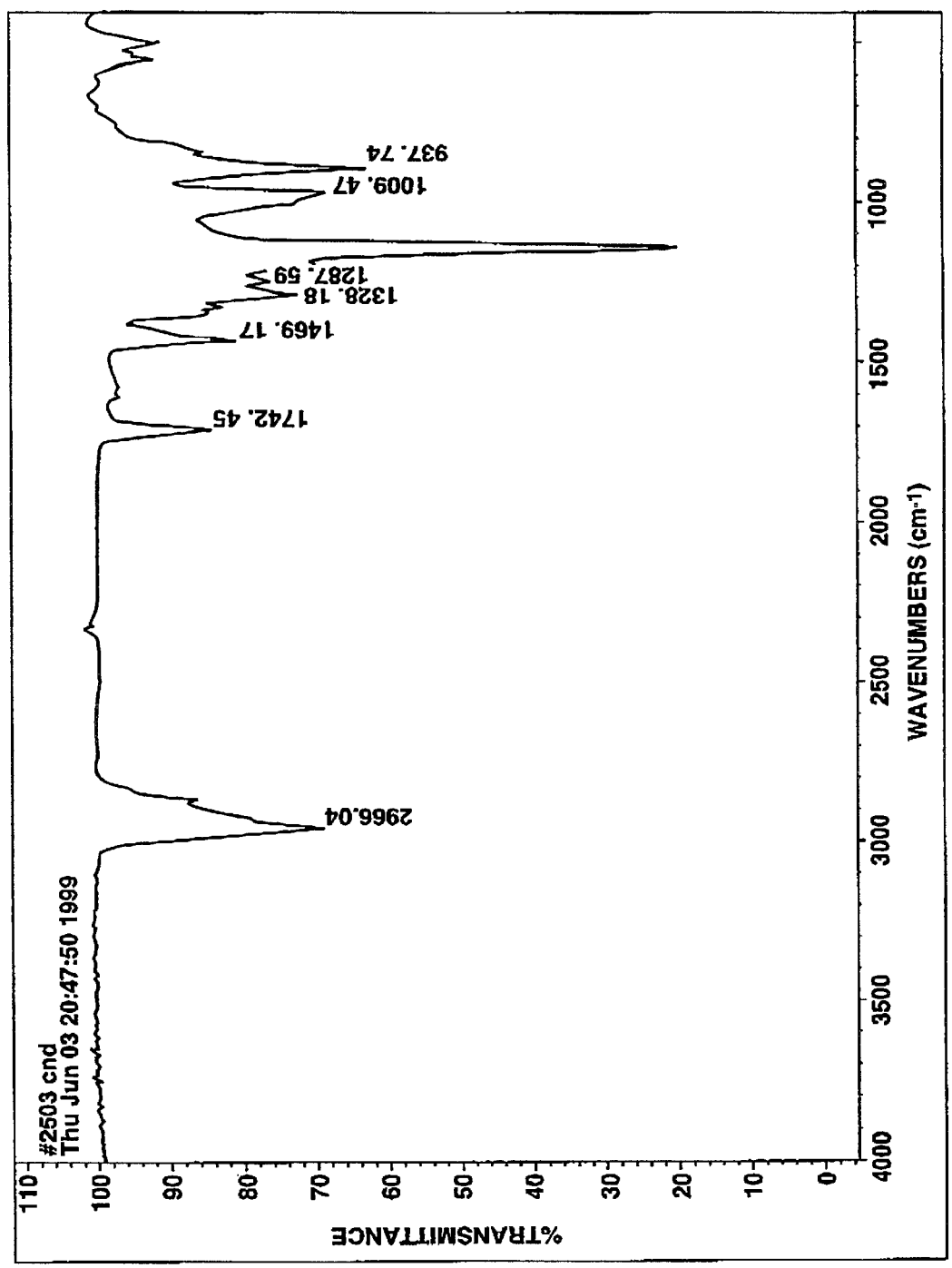

A 0.5-liter stainless steel autoclave provided with an electromagnetic stirrer was charged with 0.5 g of t-butyl peroxypivalate, 63.5 g of n-butyl acetate and 0.3 g of sodium carbonate decahydrate. The gas atmosphere in the autoclave was replaced by nitrogen gas. Then, 10.0 g of propylene and 51.0 g of octafluorocyclopentene were introduced into the autoclave. After that, the temperature in the autoclave was raised gradually. Then, the polymerization was conducted for 13 hr at 55° C. Then, the temperature was raised to 73° C., and this condition was maintained for 4 hr, followed by cooling to room temperature. After that, the polymerization liquid was taken out of the autoclave, followed by a vacuum drying at 60° C., thereby obtaining 0.85 g of a colorless, oil-like polymer. This polymer was found to have a number average molecular weight of 1,000 by the GPC. IR spectrum of this film is shown in FIG. 3.

EXAMPLE 4

Figure 4:
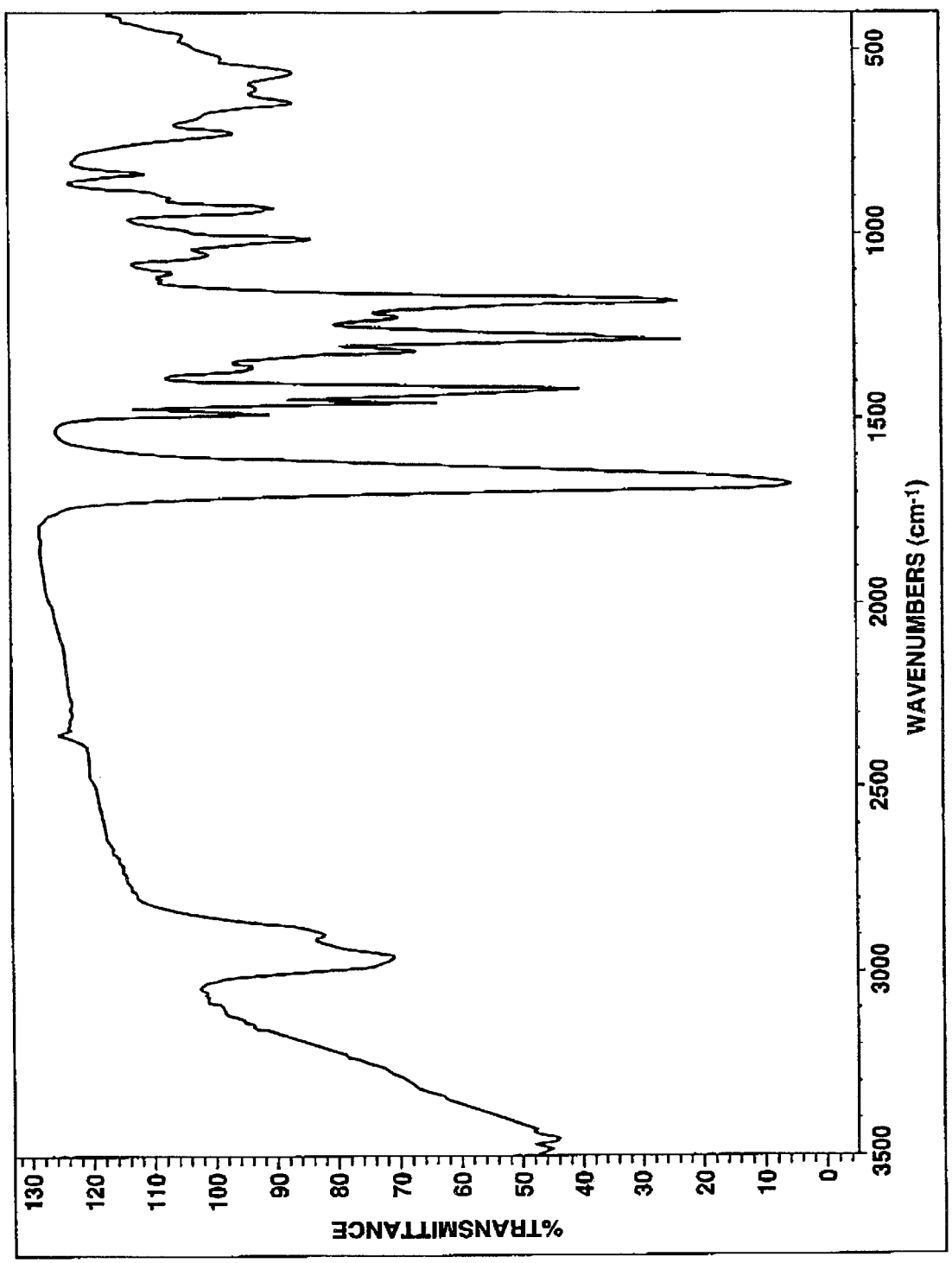

A 0.15-liter stainless steel reaction tube provided with an electromagnetic stirrer was charged with 5.2 g of 1-vinyl-2-pyrrolidone, 0.12 g of t-butyl peroxypivalate and 23.0 g of n-butyl acetate. The gas atmosphere in the reaction tube was replaced by nitrogen gas. Then, 10.0 g of octafluorocyclopentene were introduced into the reaction tube. After that, the temperature in the reaction tube was raised gradually. Then, the polymerization was conducted for 6 hr at 78° C., followed by cooling to room temperature. After that, the polymerization liquid was taken out of the reaction tube, followed by introduction into a large amount of n-hexane, thereby precipitating a resin. This resin was separated from n-hexane and then subjected to a vacuum drying at 60° C., thereby obtaining 7.5 g of a polymer in the form of a white solid. This polymer was found to have a number average molecular weight of 5,500 by the GPC. A solution was prepared by dissolving the polymer in tetrahydrofuran. This solution was applied to a glass plate, followed by drying at 140° C. With this, a colorless, transparent film having a thickness of about 10 μm was obtained. IR spectrum of this film is shown in FIG. 4.

EXAMPLE 5

Figure 5:
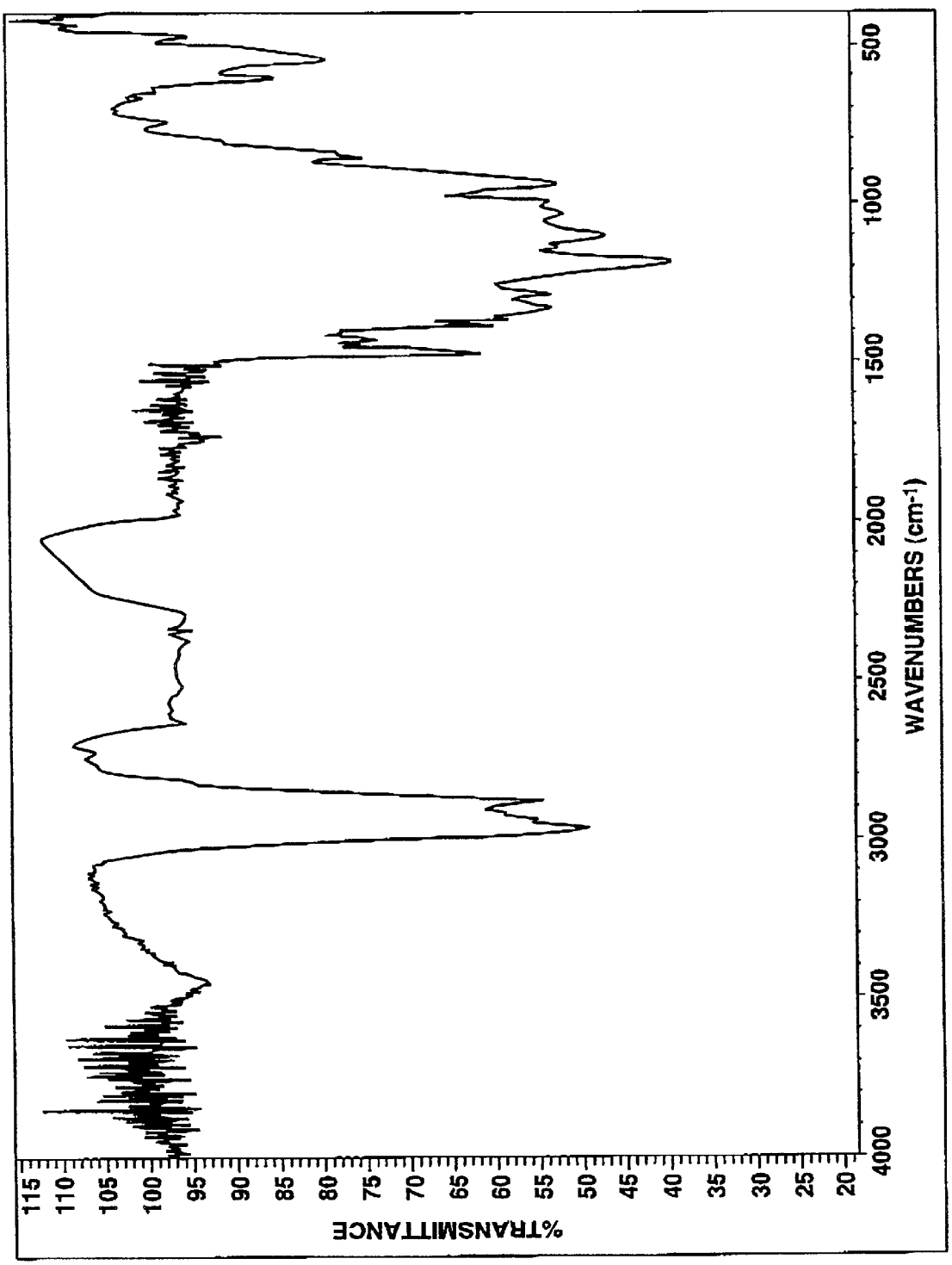

A 0.5-liter stainless steel autoclave provided with an electromagnetic stirrer was charged with 24.0 g of isobutyl vinyl ether, 5.3 g of hydroxyethyl vinyl ether, 0.7 g of t-butyl peroxypivalate and 186 g of n-butyl acetate. The gas atmosphere in the autoclave was replaced by nitrogen gas. Then, 63.7 g of octafluorocyclopentene were introduced into the autoclave. After that, the temperature in the autoclave was raised gradually. Then, the polymerization was conducted for 20 hr at 55° C., followed by cooling to room temperature. After that, the polymerization liquid was taken out of the autoclave, followed by introduction into a large amount of methanol, thereby precipitating a resin. This resin was separated from methanol and then subjected to a vacuum drying at 40° C., thereby obtaining 44 g of a polymer in the form of a white solid. This polymer was found to have a number average molecular weight of 12,900 by the GPC. A solution was prepared by dissolving the polymer in n-butyl acetate. This solution was applied to a glass plate, followed by drying at 140° C. With this, a colorless, transparent film having a thickness of about 10 μm was obtained. IR spectrum of this film is shown in FIG. 5.

EXAMPLE 6

Figure 6:
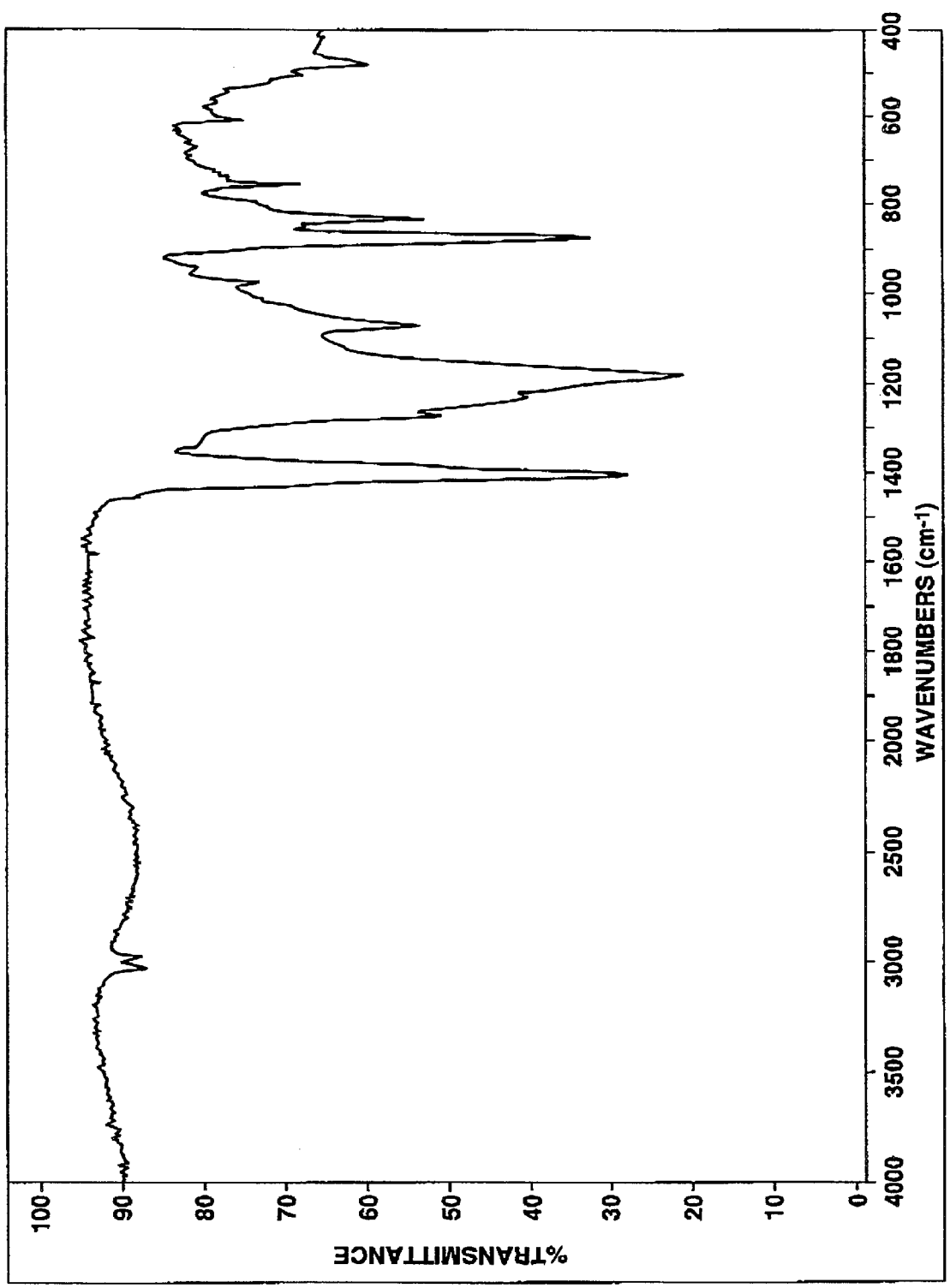

A 1.0-liter stainless steel autoclave provided with an electromagnetic stirrer was charged with 437 g of an ion-exchanged water, 0.73 g of potassium peroxodisulfate, 0.06 g of a surfactant, FC-126 (trade name) of Sumitomo 3M Co., 0.68 g of sodium tetraborate and 0.31 g of potassium hydrogenphosphate. The gas atmosphere in the autoclave was replaced by nitrogen gas. Then, 30 g of octafluorocyclopentene and 64 g of vinylidene fluoride were introduced into the autoclave. After that, the temperature in the autoclave was raised gradually. Then, the polymerization was conducted for 22 hr at 60° C., followed by cooling to room temperature. After that, the polymerization liquid was taken out of the autoclave. Then, NaCl was added to the polymerization liquid, thereby precipitating a polymer. This polymer was separated by filtration. The obtained polymer was washed with an ion-exchanged water, followed by a vacuum drying at 60° C., thereby obtaining 56.8 g of a polymer in the form of a white solid. This polymer was found to have a number average molecular weight of 569,000 determined by the GPC and a melting point of 166.7° C. determined by the DSC. The polymer was pressed at 200° C. into a film having a thickness of about 10 μm. IR spectrum of this film is shown in FIG. 6.

EXAMPLE 7

As shown in Table, a stainless steel autoclave provided with an electromagnetic stirrer was charged with 35 g of isopropyl vinyl ether (iPVE), 1 g of t-butyl peroxypivalate (PPv), and 120 g of butyl acetate (BuAc). The gas atmosphere in the autoclave was replaced by nitrogen gas. Then, 85 g of octafluorocyclopentene (OFCPE) were introduced into the autoclave. After that, the temperature in the autoclave was raised gradually. Then, the polymerization was conducted for 13 hr at 55° C. Then, the polymerization liquid was taken out of the autoclave, followed by introduction into a large amount of methanol, thereby obtaining 78 g of a fluorine-containing copolymer. This copolymer was found to contain 48 wt % of fluorine and to have a number average molecular weight of 15,000 by the GPC. A solution was prepared by dissolving the copolymer in methyl isobutyl ketone. The copolymer content of this solution was 10 wt %. The solution was applied to a glass plate of soda-lime glass by spin coating, followed by drying at 140° C. for 1 hr. With this, a transparent, flat film of the copolymer was obtained.

Several evaluation tests were conducted as follows. A dissolution test was conducted by trying to dissolve 0.1 g of the fluorine-containing copolymer in 0.5 g of each of methyl isobutyl ketone (MiBK) and butyl acetate (BuAc) at room temperature. The results of this test are shown in Table where "good" means that the copolymer dissolved in the solvent and "no good" means that it did not dissolve therein. The reflectance ($N_D^{25}$) from the coated glass plate was determined at 550 nm with a U-4000 type automated spectrophotometer of Hitachi, Ltd. Pencil hardness of the coated film was determined in accordance with Japanese Industrial Standard (JIS) K5400 using a C221 type pencil hardness meter of Yoshimitsu Co. Separately, the obtained copolymer was subjected to a hot pressing at 100° C. for 5 minutes under a pressure of 0.5 MPa, thereby obtaining a film having a thickness of 150 μm. The refractive index of this film was determined with an Abbe's refractometer. The results of these tests are shown in Table.

TABLE

|  | Example 7 | Example 8 | Example 9 | Example 10 | Example 11 | Example 12 | Com. Ex. 1 | Com. Ex. 2 |
|---|---|---|---|---|---|---|---|---|
| Monomer Composition (g) | | | | | | | | |
| OFCPE | 85 | 106 | 85 | 54 | 32 | 84 | — | — |
| Comonomer(s) | IPVE* (35 g) | EVE* (36 g) | MVE (29 g) | IBVE* (25 g) | VAc* (13 g) | HEVE (11 g) & MVE (16 g) | — | — |
| PPv | 1 | 0.6 | 0.6 | 0.5 | 0.3 | 1 | — | — |
| BuAc | 120 | 85 | 81 | 78 | 45 | 110 | — | — |
| Copolymer Yield (g) | 78 | 92 | 74 | 51 | 29 | 72 | — | — |
| Copolymer Properties | | | | | | | | |
| Molecular Weight | 15,000 | 16,000 | 35,000 | 14,000 | 18,000 | 21,000 | — | — |
| F content (wt %) | 48 | 52 | 55 | 43 | 18 | 52 | — | — |
| Dissolution in MiBK | Good | Good | Good | Good | Good | Good | — | No good |
| Dissolution in BuAc | Good | Good | Good | Good | Good | Good | — | No good |
| Film Properties | | | | | | | | |
| Refractive Index | 1.395 | 1.390 | 1.388 | 1.399 | 1.438 | 1.399 | — | 1.340 |
| Pencil Hardness | 2H | 2H | 2H | 2H | 3H | 3H | — | 4B |
| Reflectance (%) | 1.1 | 1.0 | 1.0 | 1.5 | 1.9 | 1.5 | 8.1 | 1.0 |

IPVE: isopropyl vinyl ether,
EVE: ethyl vinyl ether,
IBVE: isobutyl vinyl ether,
VAc: vinyl acetate.

EXAMPLES 8–11

In these examples, Example 1 was repeated except in that the monomer composition was changed as shown in Table.

EXAMPLE 12

As shown in Table, a stainless steel autoclave provided with an electromagnetic stirrer was charged with 11 g of hydroxyethyl vinyl ether (HEVE), 1 g of PPv and 110 g of BuAc. The gas atmosphere in the autoclave was replaced by nitrogen gas. Then, 84 g of OFCPE and 16 g of methyl vinyl ether (MVE) were introduced into the autoclave. After that, the temperature in the autoclave was raised gradually. Then, the polymerization was conducted for 13 hr at 55° C., thereby obtaining a fluorine-containing copolymer containing 52 wt % of fluorine. The obtained fluorine-containing copolymer was dissolved in methyl isobutyl ketone, followed by addition of 5 wt % of DESMODUR Z4370 of Sumitomo Bayer Urethane Co., thereby preparing a solution containing 10 wt % of the fluorine-containing copolymer. This solution was applied to a glass plate by spin coating, followed by drying at 140° C. for 1 hr. With this, a transparent, flat film of the copolymer was obtained. This film was subjected to the same evaluation tests as those of Example 7. The results are shown in Table.

COMPARATIVE EXAMPLE 1

The reflectance from a glass plate having no film thereon, which is the same as those used in Examples 7–12, was measured in the same manner as that of Example 1. The result is shown in Table.

COMPARATIVE EXAMPLE 2

An amorphous resin, SAITOP (trade name of Asahi Glass Co., Ltd.), was dissolved in perfluoro(2-butyltetrahydrofuran), thereby obtaining a 10% solution. This solution was applied by spin coating to a glass substrate that is the same as those of Examples 7–12, thereby forming thereon a fluorine-containing copolymer film. This film was subjected to a drying at 140° C. for 1 hr and then to the same tests as those of Example 7 with respect to refractive index, pencil hardness and reflectance.

The entire disclosure of each of Japanese Patent Application Nos. 11-231687 filed on Aug. 18, 1999 and 2000-084628 filed on Mar. 24, 2000, including specification, claims, drawings and summary, is incorporated herein by reference in its entirety.

What is claimed is:

1. A fluorine-containing copolymer comprising:
   1–99 mol % of a first repeating unit represented by the chemical formula (1) or (2); and
   99–1 mol % of a second repeating unit represented by the general formula -Q- where Q is a bivalent organic group,

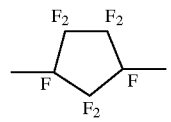

(1)

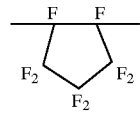

(2)

wherein said fluorine-containing copolymer has a number average molecular weight of from 1,000 to 1,000,000 determined in a gel permeation chromatography using polystyrene as a standard material thereof, wherein said bivalent organic group is selected from the group consisting of:

a first group represented by the general formula —CH$_2$—CH(OR$^2$)— where R$^2$ is hydrogen atom or a C$_1$–C$_{30}$ group that is an alkyl group, a cycloalkyl group, a fluoroalkyl group or a cyclofluoroalkyl group, said C$_1$–C$_{30}$ group optionally having a substituent that is a lower alkyl group, a cycloalkyl group, a lower fluoroalkyl group, a hydroxyl group, an organic silicon-containing group having a hydrolyzable group, an epoxy group or a β-ketoester group, a second group represented by the general formula —CH$_2$—CH(CH$_2$OR$^2$)— where R$^2$ is defined as above, a third group represented by the general formula —CF$_2$—CF(OR$_f$)— where R$_f$ is a perfluoroalkyl group, and a fourth group represented by the general formula —CH$_2$—CH(O—COR$^3$)— where R$^3$ is hydrogen atom or a C$_1$–C$_{30}$ group that is an alkyl group, a cycloalkyl group, a fluoroalkyl group or a cyclofluoroalkyl group, said C$_1$–C$_{30}$ group optionally having a substituent that is a lower alkyl group, a cycloalkyl group, a lower fluoroalkyl group, a hydroxyl group, an organic silicon-containing group having a hydrolyzable group, an epoxy group or a β-ketoester group.

2. A fluorine-containing copolymer according to claim 1, wherein said number average molecular weight is from 10,000 to 1,000,000.

3. A fluorine-containing copolymer according to claim 1, wherein said number average molecular weight is from 1,000 to 100,000.

4. A fluorine-containing copolymer according to claim 1, wherein said number average molecular weight is from 5,000 to 1,000,000.

5. A process for producing a fluorine-containing copolymer, said copolymer comprising:

1–99 mol % of a first repeating unit represented by the chemical formula (1) or (2); and 99–1 mol % of a second repeating unit represented by the general formula -Q- where Q is a bivalent organic group,

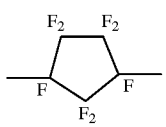

(1)

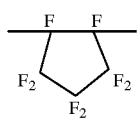

(2)

wherein said fluorine-containing copolymer has a number average molecular weight of from 1,000 to 1,000,000 determined in a gel permeation chromatography using polystyrene as a standard material thereof, said process comprising polymerizing 1–99 mol % octafluoropropene with 99–1 mol % of a compound selected from the group consisting of:

a first compound that is a vinyl ether represented by the general formula CH$_2$=CH(OR$^2$) where R$^2$ is hydrogen atom or a C$_1$–C$_{30}$ group that is an alkyl group, a cycloalkyl group, a fluoroalkyl group or a cyclofluoroalkyl group, said C$_1$–C$_{30}$ group optionally having a substituent that is a lower alkyl group, a cycloalkyl group, a lower fluoroalkyl group, a hydroxyl group, an organic silicon-containing group having a hydrolyzable group, an epoxy group or a β-ketoester group, a second that compound is an alkyl ether represented by the general formula CH$_2$=CH(CH$_2$OR$^2$) where R$^2$ is defined as above, a third compound that is a perfluoroalkyl vinyl ether represented by the general formula CF$_2$=CF(OR$_f$) where R$_f$ is a perfluoroalkyl group, and a fourth compound that is a carboxylic acid vinyl ester represented by the general formula CH$_2$=CH(O—COR$^3$) where R$^3$ is hydrogen atom or a C$_1$–C$_{30}$ group that is an alkyl group, a cycloalkyl group, a fluoroalkyl group or a cyclofluoroalkyl group, said C$_1$–C$_{30}$ group optionally having a substituent that is a lower alkyl group, a cycloalkyl group, a lower fluoroalkyl group, a hydroxyl group, an organic silicon-containing group having a hydrolyzable group, an epoxy group or a β-ketoester group.

6. A fluorine-containing copolymer which is prepared by a process comprising polymerizing 1–99 mol % of an octafluorocyclopentene with 99–1 mol % of a compound having a polymerizing double bond, wherein said fluorine-containing copolymer has a number average molecular weight of from 1,000 to 1,000,000 determined in a gel permeation chromatography using polystyrene as a standard material thereof, wherein said compound is selected from the group consisting of:

a first compound that is a vinyl ether represented by the general formula CH$_2$=CH(OR$^2$) where R$^2$ is hydrogen atom or a C$_1$–C$_{30}$ group that is an alkyl group, a cycloalkyl group, a fluoroalkyl group or a cyclofluoroalkyl group, said C$_1$–C$_{30}$ group optionally having a substituent that is a lower alkyl group, a cycloalkyl group, a lower fluoroalkyl group, a hydroxyl group, an organic silicon-containing group having a hydrolyzable group, an epoxy group or a β-ketoester group, a second compound that is an allyl ether represented by the general formula CH$_2$=CH(CH$_2$OR$^2$) where R$^2$ is defined as above, a third compound that is a perfluoroalkyl vinyl ether represented by the general formula CF$_2$=CF(OR$_f$) where R$_f$ is a perfluoroalkyl group, and a fourth compound that is a carboxylic acid vinyl ester represented by the general formula CH$_2$=CH(O—COR$^3$) where R$^3$ is hydrogen atom or a C$_1$–C$_{30}$ group that is an alkyl group, a cycloalkyl group, a fluoroalkyl group or a cyclofluoroalkyl group, said C$_1$–C$_{30}$ group optionally having a substituent that is a lower alkyl group, a cycloalkyl group, a lower fluoroalkyl group, a hydroxyl group, an organic silicon-containing group having a hydrolyzable group, an epoxy group or a β-ketoester group.

7. A composition for forming a lower reflectance film, said composition comprising as a film-forming component a fluorine-containing polymer comprising a repeating unit that is represented by the chemical formula (1) or (2),

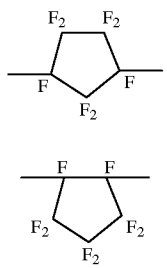

(1)

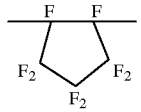

(2)

wherein said fluorine-containing polymer further comprises another repeating unit represented by the general formula -Q- where Q is a bivalent organic group selected from the group consisting of:

a first group represented by the general formula —$CH_2$—$CH(OR^2)$— where $R^2$ is hydrogen atom or a $C_1$–$C_{30}$ group that is an alkyl group, a cycloalkyl group, a fluoroalkyl group or a cyclofluoroalkyl group, said $C_1$–$C_{30}$ group optionally having a substituent that is a lower alkyl group, a cycloalkyl group, a lower fluoroalkyl group, a hydroxyl group, an organic silicon-containing group having a hydrolyzable group, an epoxy group or a β-ketoester group, a second group represented by the general formula —$CH_2$—$CH(CH_2OR^2)$— where $R^2$ is defined as above, a third group represented by the general formula —$CF_2$$CF(OR_f)$— where $R_f$ is a perfluoroalkyl group, and a fourth group represented by the general formula —$CH_2$—$CH(O$—$COR^3)$— where $R^3$ is hydrogen atom or a $C_1$–$C_{30}$ group that is an alkyl group, a cycloalkyl group, a fluoroalkyl group or a cyclofluoroalkyl group, said $C_1$–$C_{30}$ group optionally having a substituent that is a lower alkyl group, a cycloalkyl group, a lower fluoroalkyl group, a hydroxyl group, an organic silicon-containing group having a hydrolyzable group, an epoxy group or a β-ketoester group.

8. A composition according to claim 7, wherein said fluorine-containing polymer comprises 1–99 mol % of said repeating unit and 99–1 mol % of said another repeating unit.

9. A composition according to claim 7, wherein said fluorine-containing polymer is prepared by copolymerizing 1–99 mol % of an octafluorocyclopentene with 99–1 mol % of a compound having a polymerizing double bond, wherein said compound is selected from the group consisting of:

a first compound that is a vinyl ether represented by the general formula $CH_2$=$CH(OR^2)$, a second compound that is an allyl ether represented by the general formula $CH_2$=$CH(CH_2OR^2)$, a third compound that is a perfluoroalkyl vinyl ether represented by the general formula $CF_2$=$CF(OR_f)$, and a fourth compound that is a carboxylic acid vinyl ester represented by the general formula $CH_2$=$CH(O$—$COR^3)$.

10. A composition according to claim 7, wherein said fluorine-containing polymer has a number average molecular weight of from 1,000 to 1,000,000 determined in a gel permeation chromatography using polystyrene as a standard material thereof.

11. A composition according to claim 7, further comprising a solvent that is in an amount sufficient for making said composition a homogeneous solution.

12. A composition according to claim 7, further comprising a curing agent that is in an amount sufficient for curing said fluorine-containing polymer.

13. An article comprising:
a substrate; and
a low reflectance film covering said substrate, said low reflectance film being prepared by a process comprising applying a composition to said substrate, said composition comprising as a film-forming component a fluorine-containing polymer comprising a repeating unit that is represented by the chemical formula (1) or (2),

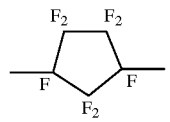

(1)

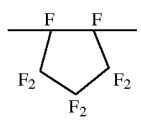

(2)

wherein said fluorine-containing polymer further comprises another repeating unit represented by the general formula -Q- where Q is a bivalent organic group selected from the group consisting of:

a first group represented by the general formula —$CH_2$—$CH(OR^2)$— where $R^2$ is hydrogen atom or a $C_1$–$C_{30}$ group that is an alkyl group, a cycloalkyl group, a fluoroalkyl group or a cyclofluoroalkyl group, said $C_1$–$C_{30}$ group optionally having a substituent that is a lower alkyl group, a cycloalkyl group, a lower fluoroalkyl group, a hydroxyl group, an organic silicon-containing group having a hydrolyzable group, an epoxy group or a β-ketoester group, a second group represented by the general formula —$CH_2$—$CH(CH_2OR^2)$— where $R^2$ is defined as above, a third group represented by the general formula —$CF_2$—$CF(OR_f)$— where $R_f$ is a perfluoroalkyl group, and a fourth group represented by the general formula —$CH_2$—$CH(O$—$COR^3)$— where $R^3$ is hydrogen atom or a $C_1$–$C_{30}$ group that is an alkyl group, a cycloalkyl group, a fluoroalkyl group or a cyclofluoroalkyl group, said $C_1$–$C_{30}$ group optionally having a substituent that is a lower alkyl group, a cycloalkyl group, a lower fluoroalkyl group, a hydroxyl group, an organic silicon-containing group having a hydrolyzable group, an epoxy group or a β-ketoester group.

14. A composition according to claim 1, wherein said bivalent organic group is selected from the group consisting of said first, second and fourth groups.

15. A process according to claim 5, wherein said compound is selected from the group consisting of said first, second and fourth compounds.

16. A fluorine-containing copolymer according to claim 6, wherein said compound is selected from the group consisting of said first, second and fourth compounds.

17. A composition according to claim 7, wherein said bivalent organic group is selected from the group consisting of said first, second and fourth groups.

18. A composition according to claim 9, wherein said compound is selected from the group consisting of said first, second and fourth compounds.

19. An article according to claim 13, wherein said bivalent organic group is selected from the group consisting of said first, second and fourth groups.

* * * * *